Patented June 4, 1940

2,203,090

UNITED STATES PATENT OFFICE 2,203,090

PROCESS FOR TREATING RUBBER AND PRODUCT OBTAINED THEREBY

Louis H. Howland, Nutley, N. J., assignor, by mesne assignments, to United States Rubber Company, New York, N. Y., a corporation of New Jersey No Drawing. Application February 25, 1938, Serial No. 192,581

7 Claims. (Cl. 260—791)

This invention relates to the treatment of rubber and to the production of vulcanized goods therefrom. More particulary the invention relates to a new class of vulcanization accelerators.

According to the invention a vulcanizable rubber stock is vulcanized in the presence of a heterocyclic mercapto compound having the nuclear structure:

(A) 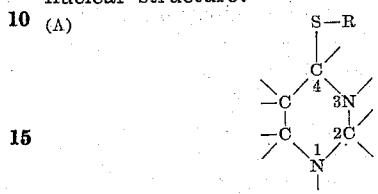

in which R is hydrogen or a substitute radical. The nitrogen in the nucleus next to the carbon atom which is linked to sulphur is preferably joined to said carbon atom through a double bond, as shown in (B) 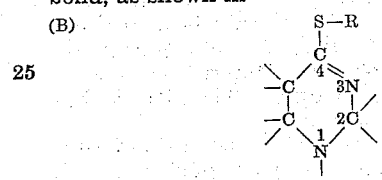

A mercaptan of such structure is capable of existing a keto or enol form, and the two forms may exist in equilibrium with each other, and for the purposes of this invention are equivalent. There may also be a double bond in the 1-2 position, as shown in (C) 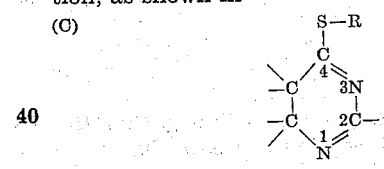

Like the known mercaptothiazole accelerators, the heterocyclic nucleus of the present accelerators may be condensed with a carbocyclic ring, such condensed-ring compounds being mercapto arylene-pyrimidines, more commonly known as mercapto quinazolines, having the nuclear structure

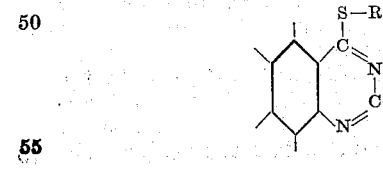

The compounds may be used in the unsaturated form, or in the partially saturated or the completely saturated state, represented respectively by C, B, and A. Furthermore, the compounds may contain one or more further substituents on the nuclear carbon atoms, such as alkyl, cyclo-alkyl, aryl, aralkyl, heterocyclic, hydroxy, alkoxy, aryloxy, amino, substituted amino, etc. Also the nitrogen atom in the 1-position, in 1-2 dihydro compounds, may have as a substituent hydrogen, alkyl, aryl, aralkyl, cyclo-alkyl, heterocyclic, amino, or substituted amino, acyl, etc. When more than one substituent is contained in the same molecule, the substituents may be the same or different.

As in the case of the thiazole accelerators, the present accelerating compounds may exist in the form of various derivatives, including the monosulphides, polysulphides, metallic salts, ammonia or amine salts, esters or salts hydrolyzing or decomposing to an accelerating body at vulcanization temperatures, acidyl derivatives, mixed anhydrides, aldehyde derivatives, particularly formaldehyde derivatives, ketone derivatives, particularly acetone derivatives,—indicating that R in the above structure may be specifically ammonia radical, substituted ammonia radical, a metal such as sodium, calcium, zinc, lead, cadmium, etc., an ester group, an aryl group, a sulphide group, etc.

The compounds may be used in the presence or absence of adjuvants such as ammonia compounds, amines, amine salts, and organic bases in general including urea and the diaryl guanidines and their acyl derivatives. They may further be used in conjunction with other accelerators, among them being the aldehyde-amines, guanidines, guanidine salts, dithio-carbamates, xanthates, mercaptobenzothiazoles, etc.

It is thus apparent that the compounds may be either mono-cyclic or poly-cyclic, and that the ring structure may be saturated or unsaturated, so long as the essential grouping shown in the formula first given is retained. The materials may be used either in their pure or less pure forms. Any of the methods known to the art for making such mercapto substituted chemicals or their derivatives may be employed for making the new accelerators.

More particularly included among such compounds are the following: 4-mercapto pyrimidine; 4-mercapto-6-methyl pyrimidine; 4-mercapto 5-methyl pyrimidine; 4-mercapto-6,6 diethyl pyrimidine; 4,6-dimercapto pyrimidine; 2,4-dimercapto pyrimidine; 4-mercapto dihydropyrimidine; 4-mercapto tetra hydropyrimidine; 4-mercapto-2-methyl quinazoline; 4-mercapto-2-dodecyl-quinazoline; 4-mercapto-2-phenyl quinazoline; 4-mercapto-2,6 dimethyl quinazoline; 4-mercapto dihydro quinazoline; 4-mercapto-N-methyl dihydro quinazoline; 4-mercapto-8-ethoxy quinazoline; 4-mercapto-5,6-naphtho pyrimidine; etc.

In illustration of the invention, the following examples are given, the parts being by weight:

*Example 1*

4-mercapto-quinazoline, (4-mercaptobenzopyrimidine) which is pictured as follows:

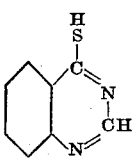

is prepared by the following procedure:

30 grams of 4-oxyquinazoline and 48 grams of phosphorus pentasulphide ($P_2S_5$) are ground together in a mortar and placed in a 500 cc. round bottomed flask with 300 cc. of xylene. The reaction mixture is refluxed for 3 hours using an oil bath (temp. of oil bath 155° C.), and is then filtered hot. The residue is boiled one hour with 100 cc. concentrated hydrochloric acid, diluted with water and again filtered. The yellow residue is dissolved in 10% sodium hydroxide, the solution is filtered, and the compound is precipitated by addition of dilute hydrochloric acid. After drying, the product is recrystallized from boiling alcohol. The yield is 45% of the theory and the product melts at 306° C. The product when analyzed for sulphur shows

|  | Found | Theory |
|---|---|---|
| Percent sulphur | 19.56<br>19.70 | 19.75 |

A mix was made containing 100 parts of rubber, 10 parts of zinc oxide, 2 parts of stearic acid, 3 parts of sulphur and 0.2 part of 4-mercapto quinazoline. The mix was cured 30 minutes and 60 minutes at 30# sq. in. steam pressure. The tensile (T) and percent elongation (E) are as follows:

|  | T | E |
|---|---|---|
| 30′ at 30# | 3552 | 730 |
| 60′ at 30# | 3598 | 720 |

*Example 2*

2,4-dimercapto-quinazoline, which is pictured as follows:

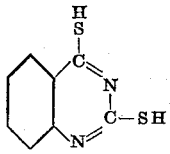

is prepared as follows:

5.5 grams of 2,4-diketo-tetrahydro-quinazoline and 16.0 grams of $P_2S_5$ are ground together and refluxed in xylene as in Example 1 for 6 hours at an oil bath temperature of 155° C. The reaction mixture is filtered hot. The residue is boiled one hour with 75 cc. concentrated hydrochloric acid, then water is added, and the solution is removed by filtration. The yellow residue is dissolved in hot 10% sodium hydroxide. After filtration the product is separated from the filtrate by acidifying with dilute hydrochloric acid. The yellow precipitate is washed with water and finally with petroleum ether.

Yield=6 gms. Theory=6.58 gms. (91% of theory).

|  | Found | Theory |
|---|---|---|
| Analysis for sulphur | Per cent<br>32.4 | Per cent<br>32.99 |

A mix was made containing 100 parts of rubber, 10 parts of zinc oxide, 2 parts of stearic acid, 3 parts of sulphur and 0.2 part of 2,4-dimercapto quinazoline. The mix was cured 60 minutes at 30# sq. in. steam pressure. The tensile and percent elongation at break are as follows:

|  | T | E |
|---|---|---|
| 30′ at 30# | 4546 | Per cent<br>770 |
| 60′ at 30# | 4561 | 790 |

*Example 3*

The zinc salt of 4-mercapto-quinazoline, which is pictured as follows:

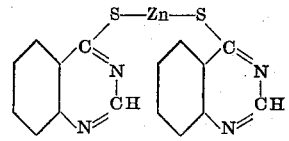

is prepared as described below:

16.2 grams (0.1 mole) of 4-mercapto-quinazoline, is dissolved in 200 cc. of water containing 4 grams (0.1 mole) of sodium hydroxide. To this solution, at room temperature, is added, while stirring, 25 grams of zinc nitrate hexa hydrate dissolved in 60 cc. of water. A yellow precipitate is formed immediately and is filtered off, washed with hot water, and air dried. The yield is 21.5 grams or 92.3% of theory.

A mix was made containing 100 parts of rubber, 10 parts of zinc oxide, 2 parts of stearic acid, 3 parts of sulphur, and 0.2 part of the zinc salt of 4-mercapto quinazoline. The mix was cured 30 minutes and 60 minutes at 30# sq. in. steam pressure. The tensile and percent elongation at break are as follows:

|  | T | E |
|---|---|---|
| 60′ at 30# | 2427 | 850 |

It is clear from the above examples that the compounds of the invention are powerful accelerators of vulcanization.

The new accelerators may be added to the rubber by mill incorporation, by impregnation, by addition to latex or other dispersions thereof, or the rubber may be vulcanized in aqueous or organic solutions of the accelerator. The accelerators may be used in a variety of rubber mixes, and the stocks subjected either to mold cures, air cures, ammonia cures, submarine cures, steam cures, etc.

Generally, basic substituents attached to the heterocyclic nucleus or in the salt or ester forming group tend to reduce the factor of safety against scorching, while acidic or negative substituents attached to the heterocyclic nucleus or in the salt or ester forming group tend to increase that factor. The desirability of introducing these various substituents will be governed by the kind and type of cure desired. In many cases it will be found that the type of stock and nature of cure desired governs the use or not of an activator amine and the use or not of a class of accelerator compound devoid of such basic or acidic substituents. In place of the activator zinc oxide, oxides of other metals and their salts may be used as is known in the art. Also in place of zinc salts of higher fatty acids, the higher fatty acids themselves may be used such as stearic, oleic, lauric, etc.

Various compounding ingredients such as fillers, pigments, softeners, anti-oxidants, anti-scorch chemicals, or vulcanization retarders may be employed in practicing the invention. The accelerators may be used in the vulcanization of whole latex rubber or rubber recovered from latex by coagulation or separated from latex by mechanical or centrifugal creaming or chemical creaming methods as will be apparent to those skilled in the art.

The term "rubber" is to be construed broadly as including besides caoutchouc, reclaimed rubbers, gutta percha, balata, synthetic rubber, rubber isomers, etc., as well as natural or artificial rubber latices or aqueous dispersions of rubber. The methods of using the various accelerating agents herein set forth, as to the quantity employed, time of vulcanization, the heat required, and the proportions of metal oxide, sulphur and other ingredients may be varied without departing from the principle of the invention, as hereafter claimed.

Having thus described my invention, what I claim and desire to protect by Letters Patent is:

1. The process of producing vulcanized rubber products which comprises vulcanizing the rubber in the presence of an accelerator which is a pyrimidine-4-sulphide.

2. The process of producing vulcanized rubber products which comprises vulcanizing the rubber in the presence of an accelerator which is an ortho - arylene - pyrimidine - 4 - sulphide selected from the benzopyrimidine, and the naphthopyrimidine series.

3. The process of producing vulcanized rubber products which comprises vulcanizing the rubber in the presence of an accelerator which is a quinazoline-4-sulphide.

4. The process of producing vulcanized rubber products which comprises vulcanizing the rubber in the presence of an accelerator which is a quinazoline-4-sulphide having a salt-forming radical directly attached to the 4-sulphur atom.

5. The process of producing vulcanized rubber products which comprises vulcanizing the rubber in the presence of an accelerator which is a metal salt of a 4-mercapto quinazoline.

6. The process of producing vulcanized rubber products which comprises vulcanizing the rubber in the presence of 4-mercapto-quinazoline.

7. The process of producing vulcanized rubber products which comprises vulcanizing the rubber in the presence of the zinc salt of 4-mercaptoquinazoline.

LOUIS H. HOWLAND.